United States Patent
Almgren et al.

(10) Patent No.: US 12,282,542 B2
(45) Date of Patent: Apr. 22, 2025

(54) DEPARTURE-BASED PROCESS-LEVEL DETECTION OF STEALTHY ATTACKS ON CONTROL SYSTEMS

(71) Applicant: CLAVISTER TECHNOLOGIES AB, Gothenburg (SE)

(72) Inventors: Magnus Almgren, Gothenburg (SE); Wissam Aoudi, Gothenburg (SE)

(73) Assignee: CLAVISTER TECHNOLOGIES AB, Gothenburg (SE)

( * ) Notice: Subject to any disclaimer, the term of this patent is extended or adjusted under 35 U.S.C. 154(b) by 447 days.

(21) Appl. No.: 17/283,445

(22) PCT Filed: Oct. 3, 2019

(86) PCT No.: PCT/SE2019/050962
§ 371 (c)(1),
(2) Date: Apr. 7, 2021

(87) PCT Pub. No.: WO2020/076219
PCT Pub. Date: Apr. 16, 2020

(65) Prior Publication Data
US 2021/0349992 A1    Nov. 11, 2021

(30) Foreign Application Priority Data

Oct. 12, 2018 (SE) .................................. 1851255-8
Oct. 26, 2018 (SE) .................................. 1851335-8

(51) Int. Cl.
*G06F 21/55* (2013.01)
*G06F 21/56* (2013.01)

(52) U.S. Cl.
CPC .......... *G06F 21/552* (2013.01); *G06F 21/566* (2013.01); *G06F 2221/034* (2013.01)

(58) Field of Classification Search
CPC ................ G06F 21/552; G06F 21/566; G06F 2221/034; G06F 21/554; Y02P 90/02; H04L 63/1425
See application file for complete search history.

(56) References Cited

U.S. PATENT DOCUMENTS

| | | | |
|---|---|---|---|
| 2010/0063611 A1* | 3/2010 | Patel | G05B 23/024 |
| | | | 700/108 |
| 2012/0063641 A1 | 3/2012 | Venkatesh | |

(Continued)

FOREIGN PATENT DOCUMENTS

| | | |
|---|---|---|
| CN | 104468606 | 10/2018 |
| WO | 2017034512 | 3/2017 |

OTHER PUBLICATIONS

Ma et al., "Application of Singular Spectrum Analysis to the Noise Reduction of Intrusion Detection Alarms", Journal of Computers, Aug. 2011 (Year: 2011).*

(Continued)

*Primary Examiner* — Henry Tsang
(74) *Attorney, Agent, or Firm* — DUANE MORRIS LLP; Gregory M. Lefkowitz; Joaquin Hernandez (57) ABSTRACT

Method and device for extracting noise-reduced signal information from a time series of sensor measurements during normal process operation and then actively checking whether present realizations of the process are departing from historical normal behavior. To extract signal information, the solution borrows ideas from singular spectrum analysis a non-parametric exploratory analysis tool for time series that is particularly suitable for separating the deterministic part of a dynamical system behavior from the chaotic part, purely from noisy time series of measurements.

13 Claims, 5 Drawing Sheets

(56) References Cited

U.S. PATENT DOCUMENTS

| 2014/0108314 A1* | 4/2014 | Chen | G06F 11/3072 |
| | | | 706/20 |
| 2017/0314961 A1 | 11/2017 | Chen | |
| 2018/0173173 A1 | 6/2018 | Leonard | |
| 2018/0191758 A1 | 7/2018 | Abbaszadeh et al. | |
| 2019/0022791 A1* | 1/2019 | D'Angelo | G01N 21/274 |

OTHER PUBLICATIONS

Jie Ma et al, "Application of Singular Spectrum Analysis to the Noise Reduction of Intrusion Detection Alarms", Journal of Computers, FI, (Aug, 1, 2011), vol. 6, No. 8, doi: 10.4304/jcp.6.8.1715-1722, ISSN 1796-203X, XP055411379.

Aoudi, W., et al., "Truth Will Out: Departure-Based Process-Level Detection of Stealthy Attacks on Control Systems," Proceedings of the ACM Conference on Computer and Communications Security: 817-831; http://dx.doi.org/10.1145/3243734.3243781.

\* cited by examiner

$$U = \begin{bmatrix} u_{11} & u_{21} & \ldots & u_{r1} \\ u_{12} & u_{22} & \ldots & \ldots \\ \ldots & \ldots & \ldots & \ldots \\ u_{1L} & u_{2L} & \ldots & u_{rL} \end{bmatrix}$$

Fig. 8

```
 1: N ← LENGTH($\mathcal{T}_{train}$)
 2: $U^T$ ← PASAD_TRAIN($\mathcal{T}_{train}$, N, L)         ▷ The partial isometry
 3: K ← N − L + 1
 4: for i ← 1, K do                                        ▷ Compute the centroid
 5:     $x_i$ ← $i^{th}$ training_vector
 6:     s ← s + $x_i$
 7: end for
 8: c ← s/K
 9: $\tilde{c}$ ← $U^T$c
10: Determine θ                                            ▷ Alarm threshold
11: for $x_j$ ← current_test_vector do
12:     y ← $\tilde{c}$ − $U^T x_j$
13:     $D_j$ ← $y^T y$                                    ▷ The departure score
14:     if $D_j$ ≥ θ then                                  ▷ Check for departure
15:         generate alarm
16:     end if
17: end for 18: function PASAD_TRAIN($\mathcal{T}_{train}$, N, L)
19:     X ← HANKEL($\mathcal{T}_{train}$, N, L)            ▷ Trajectory matrix
20:     z ← SVD(X)                                         ▷ Solve the SVD problem
21:     Determine r                                        ▷ The statistical dimension
22:     U ← z.eigenvectors(r)                              ▷ The r leading eigenvectors
23:     return $U^T$
24: end function
```

Fig. 9

DEPARTURE-BASED PROCESS-LEVEL DETECTION OF STEALTHY ATTACKS ON CONTROL SYSTEMS

CROSS-REFERENCE TO RELATED APPLICATIONS

This application is a § 371 national stage entry of International Application No. PCT/SE2019/050962, filed Oct. 3, 2019, which claims priority to Sweden Patent Applications No. 1851255-8, filed Oct. 12, 2018, and No. 1851335-8, filed Oct. 26, 2018, the entire contents of which are incorporated herein by reference.

TECHNICAL FIELD

The present invention relates generally to a method and device for departure-based process-level detection of anomalies on a cyber-physical system.

BACKGROUND ART

Systems that have both physical and computer related components, so called cyber-physical systems, are becoming increasingly susceptible to sophisticated and targeted attacks initiated by adversaries with high motivation. The attackers often possess significant domain knowledge and have resources to carry out attacks for an extensive period of time.

Conventional off-the-shelf intrusion detection systems prove ill-fit for many cyber-physical systems because they do not take process semantics into the equation. Reportedly, in attacks lately, hackers are thought to have hidden, undetected for six months, in an IT network, acquiring privileges to access systems before taking methodical steps to take the system offline. Although traditional security mechanisms can be implemented at an IT-infrastructure level of such cyber-physical systems attacks might focus on influencing the physical process rather than focusing on the IT-environment. The fundamentally different nature of these systems calls for security approaches that are tailored to the environment.

Industrial Control Systems and cyber-physical systems are often found in critical infrastructures, such as transportation, aerospace, electricity grids, nuclear plants, and gas distribution systems to name a few. Unlike traditional IT systems, which mainly manage data, Cyber-physical systems manage physical processes. The need to secure these critical cyber-physical systems cannot be overemphasized as the impact of cyber-attacks is no longer bounded by financial losses due to some service disruption or loss of data. Cyber-attacks on control systems can cause irreparable physical damage to equipment in safety-critical facilities, raw sewage to spill out into local parks and rivers, large-scale power blackouts, and severe damage to a nation's critical assets on which normal societal functioning depends.

Cyber-physical systems are evolving from isolated systems running proprietary control protocols using specialized hardware and software. The systems are increasingly adopting IT solutions by using industry-standard network protocols and operating systems to promote corporate connectivity and meet performance requirements. The integration of standard IT-based solutions is making these systems considerably less isolated from the outside world, and introducing a host of new vulnerabilities inherited from the IT sector. Another area wherein the use of cyber-physical systems increases rapidly is the Internet of Things, IoT, where the amount connected objects, or things, is growing rapidly.

A process-level intrusion detection system monitors sensors the eyes and ears of control systems and possibly control commands, to determine if the physical process is drifting from the normal or expected behavior. One popular approach frequently used in this domain proposes to build a Linear Dynamical State-Space (LDS) model of the physical process, through what is known as system identification which is subsequently used to detect anomalies in the system behavior. Although such approaches might detect anomalous behaviors, models are difficult to build, requiring massive human effort at the preliminary stage, and a complete and highly detailed model of the physical process that is not always available.

In prior art, data-driven approach has been proposed wherein historical sensor readings are used to fit a linear Auto-Regressive (AR) model. The model is used to detect deviations from what the model expects. Models predicting the future and trying to map results based on future expectations are thus common. One, in prior art common solution, is to establish multiple states that are descriptions of learned behavior. The states can for example be a normal state and an attack state, often described as mathematical representations of data. The task, in those examples, is to classify each new feature instance (vector) where the features are typically composed of properties or process variables for the underlying process of a cyber-physical system. Although, machine learning is often used, typically the idea is to apply machine learning techniques on datasets of feature vectors that have been constructed manually.

There are many disadvantages with the solutions as described in the art, for example attempting to fit a simple linear model to a time series of noisy sensor measurements may often yield inaccurate detection results when the changes in the time series are subtle.

There is an emerging trend in cyber-physical intrusion detection research where researchers have shown growing interest in developing techniques that can detect such sophisticated attacks at the process level. Although intruders may be able to hide in the IT network while figuring out their workings, the main driver of this trend is the observation that they can hardly hide their final goal, which is to cause an adverse effect on the physical process by maliciously manipulating sensor and control data.

SUMMARY OF INVENTION

As described, most of the existing approaches use prediction-based methods where a predicted value of the sensor reading at a certain time is computed, and the difference is checked against a threshold such that if the difference is large enough an alarm is raised.

The invention takes a completely different approach to the problem of detecting anomalies in a system by truly detecting anomalies instead of matching towards different features. The system achieves this by detecting if a behavior differs from a normal situation through a method wherein time series of raw data is used together with borrowed ideas from singular spectrum analysis to determine irregularities.

Instead of predicting the future, the present invention seeks to solve the easier problem of deciding whether present sensor readings are departing from past readings due to a change in the mechanism generating them. This is achieved through a two-stage method, each comprising multiple steps. The two-stages could be running independently of each other but are closely connected, the first being a training stage for the system, the second being normal operation stage. In the training stage the system learns a normal process behavior as described in the appended claims. In the normal operation stage, the method is implemented in the system as a method for determining if any anomalies occur, as also described in the appended claims.

Thus, the invention briefly relates to a method for determining anomalies, such as attacks or degradation, in a system. The solution relates to a method and a device in a cyber-physical system for determining a normal operation of the system and to detect anomalies in said cyber-physical system.

An object of the present invention is to provide a purely data-driven approach that requires no prior knowledge of the system dynamics of a cyber-physical system.

Another object is to provide a light-weight and fast model free process aware stealthy attack detection mechanism that does not use machine learning.

Another object is to provide an alternative to Auto-Regressive (AR) models that outperforms its results.

Another object is to provide a reliable solution that is easy to implement and enhances the security of a cyber-physical system.

For clarity, it shall be noted that cyber-physical systems as used herein refer to systems that comprise a physical mechanism that is controlled and monitored by some form of computer-based algorithms. The system might be connected to the internet but could also for example be connected to an intranet or being part of a complete standalone solution. It should further be noted that the system might, in one embodiment, be offline during the training stage and online during the normal operation stage. In another embodiment the system might be online in both stages and in yet another embodiment offline in both stages.

A cyber-physical system can for example be an industrial control system or an IoT connected device, IoT network, a vehicle CAN-bus system, another vehicle control system, or any other system that comprise computer interaction with tangible assets.

In one embodiment the solution relates to a method in a cyber-physical system for determining normal operation of the system. The cyber-physical system comprises at least one sensor means and a method is performed comprising the following steps:
collecting a time series of raw process data from the at least one sensor means,
defining a lag parameter,
defining a training subseries of length being a portion of the time series representing a normal process behavior, thus selecting a portion of the time series,
applying a sliding window mechanism with a length of the lag parameter to the time series,
forming a defined quantity of lagged vectors from the training subseries of length lagged with the lag parameter, wherein the defined quantity is a number of lagged vectors corresponding to the training subseries length minus the lag parameter plus one,
embedding the lagged vectors in a vector space with a number of dimensions corresponding to the lag parameter,
constructing a trajectory matrix wherein the columns are the embedded lagged vectors,
performing Singular Value Decomposition of the trajectory matrix obtaining a first set of eigenvectors, wherein the number of eigenvectors in the first set is equal to the lag parameter,
selecting a statistical dimension of the time series, and
applying the statistical dimension selecting the first eigenvectors from the first set of eigenvectors to extract noise-reduced information describing the deterministic behavior of the process.

According to one embodiment the statistical dimension is selected as an integer representing a number of eigenvectors, out of the lag parameter eigenvectors, i.e. the number of eigenvectors corresponding to the lag parameter also called L-eigenvectors.

It is one advantage that the singular value decomposition (SVD) sort the eigenvectors according to their eigenvalues, with the largest eigenvalue first. This has the effect that selecting eigenvectors by applying the statistical dimension, i.e. selecting r-number of eigenvectors provides the vectors that are significant, the vectors with high eigenvalues. The remaining corresponds more or less noise.

According to one embodiment the method further comprises the step of using the noise-reduced information to create a mathematical representation of the normal process behavior.

According to one embodiment the method further comprises the following steps to create the mathematical representation:
creating a second matrix with a number of rows corresponding to the lag parameter and a number of columns corresponding to the statistical dimension (r), wherein the columns are the noise-reduced information (6) from the first set of eigenvectors,
defining a subspace spanned by column vectors of the second matrix,
projecting the lagged vectors onto the defined subspace, and
computing the sample mean of the lagged vectors.

According to one embodiment the method comprise means to determine how far projected lagged vectors during the operation phase are from the set of projected lagged vectors during the training phase.

According to one embodiment the method further comprises the step of computing the sample mean (c) as:

$$c = \frac{1}{K}\sum_{i=1}^{K} x_i$$

wherein, $x_i$ is the $i^{th}$ lagged vector.

According to one embodiment the projected vectors of the lagged vectors form a cluster.

According to one embodiment the method further comprises calculating a centroid of the cluster formed in the subspace.

According to one embodiment the centroid is calculated as:

$$\tilde{c} = Pc$$

wherein $P = U(U^T U)^{-1} U^T = UU^T$.

According to one embodiment the method further comprises selecting a statistical dimension of the time series and the selection is conducted according to at least one of standard singular spectrum analysis recommendations, the statistical dimension corresponding to leading eigenvectors provide a good description of the signal, the lower lag parameter minus the statistical dimension eigenvectors correspond to noise, and assisted by a scree plot.

According to one aspect of the method in a cyber-physical system, a detection system in the cyber-physical system is trained as described herein and a method is provided for determining anomalies in the operation of the system. The cyber-physical system comprises at least one sensor means and the method comprises the steps:

collecting a time series of raw process data from the at least one sensor means, applying a sliding window mechanism with a length of a lag parameter to the time series, forming a lagged vector from the time series lagged with the lag parameter, thus selecting a portion of the time series, and computing a departure score by determining how far a current lagged vector is from one or more training lagged vectors.

calculate for the lagged vector a distance from a centroid.

According to one embodiment of the method in a cyber-physical system, a detection system in the cyber-physical system is trained as described herein and a method is provided for determining anomalies in the operation of the system. The cyber-physical system comprises at least one sensor means and the method comprises the steps:

collecting a time series of raw process data from the at least one sensor means, applying a sliding window mechanism with a length of a lag parameter to the time series, forming a lagged vector from the time series lagged with the lag parameter, thus selecting a portion of the time series, and computing a departure score by determining how far a current lagged vector is from one or more training lagged vectors.

calculating for the lagged vector any one of a distance from a centroid and a departure score.

According to one embodiment a departure score is computed to determine how far a lagged vector is from one or more training vectors, wherein the training vectors are lagged vectors from a normal process behavior.

According to one embodiment a distance is calculated instead of a departure score, wherein the distance is a distance between two point-sets: the set of current lagged vectors and the set of training lagged vectors.

According to one embodiment, the departure score is evaluated as the distance between the most recent lagged vector and the centroid of a cluster of training vectors.

According to one embodiment of the method in a cyber-physical system, a detection system in the cyber-physical system is trained as described herein and a method is provided for determining anomalies in the operation of the system. The cyber-physical system comprises at least one sensor means and the method comprises the steps:

collecting a time series of raw process data from the at least one sensor means, applying a sliding window mechanism with a length of a lag parameter to the time series, forming a lagged vector from the time series lagged with the lag parameter, thus selecting a portion of the time series, and calculate for the lagged vector a distance from a centroid.

According to one embodiment the distance from the centroid is a squared Euclidean distance from the centroid in the subspace calculated as:

$$D_j = \|\tilde{c} - Px_j\|^2$$

wherein, $x_j$ is the lagged vector for j greater or equal than K.

According to one embodiment the time series is a continuous time series.

According to one embodiment the method further comprises the step:

determining a threshold for said distance based on observations from the lagged vectors forming a cluster. The cluster is formed during a training phase, i.e. during the phase with a normal process behavior. The threshold is in one embodiment determined based on vectors collected after the training stage.

According to one embodiment the distance is determined by computing the Hausdorff distance.

According to one embodiment the distance is determined by computing the Euclidean distance.

According to one embodiment the method further comprises generating an alarm if the distance from the centroid exceeds the determined threshold.

According to one embodiment the distance from the centroid corresponds to a departure score for an incoming sensor observation.

According to one aspect method in a cyber-physical system is a computer-implemented method.

According to one aspect a computer-readable medium comprising instructions which, when executed by a computer, cause the computer to carry out any of the steps as described above.

According to one embodiment at least one of defining a lag parameter, defining a training subseries of length being a portion of the time series representing a normal process behavior, thus selecting a portion of the time series, and forming a defined quantity is entered a as an integer in the computer-readable medium.

In one embodiment, a light-weight and fast model-free Process-Aware Stealthy-Attack Detection mechanism disclosed that monitors sensors in cyber-physical systems in real time and raises an alarm whenever a structural change in the behavior of the physical process is suspected.

In addition to the aforementioned benefits, an advantage of the approach as described herein over existing methods is the fact that the present solution is capable of detecting slight variations in the sensor signal, owing to its impressive noise-reduction capabilities. This leads to the possibility of detecting strategic attackers who may try to hide their attacks even at the process level, by injecting just enough false data that the compromised sensor values remain roughly within the noise level.

BRIEF DESCRIPTION OF DRAWINGS

The invention is now described, by way of example, with reference to the accompanying drawings, in which.

DESCRIPTION OF EMBODIMENTS

In the following, a detailed description of the different embodiments of the invention is disclosed under reference to the accompanying drawings. All examples herein should be seen as part of the general description and are therefore possible to combine in any way of general terms. Individual features of the various embodiments and aspects may be combined or exchanged unless such combination or exchange is clearly contradictory to the overall function.

Briefly, the solution relates to a method and device that initially extracts noise-reduced signal information from a time series of sensor measurements during normal process operation and then actively checks whether present realizations of the process are departing from historical normal behavior. To extract signal information, the solution borrows ideas from singular spectrum analysis a non-parametric exploratory analysis tool for time series that is particularly suitable for separating the deterministic part of a dynamical system behavior from the chaotic part, purely from noisy time series of measurements.

Once signal information has been extracted, the present solution proceeds by identifying a subspace, sometimes also referred to as a signal subspace, that describes the deterministic variability in the time series produced by the process during normal activity. Afterwards, the most recent observations (lagged vectors thereof) are projected onto this subspace and a departure score, or distance, is computed for every new observation. A persistent increase in the computed score suggests that current observations are not in accordance with the estimated dynamics, and that a malicious change in the mechanism generating the time series may be occurring.

Figure 1:
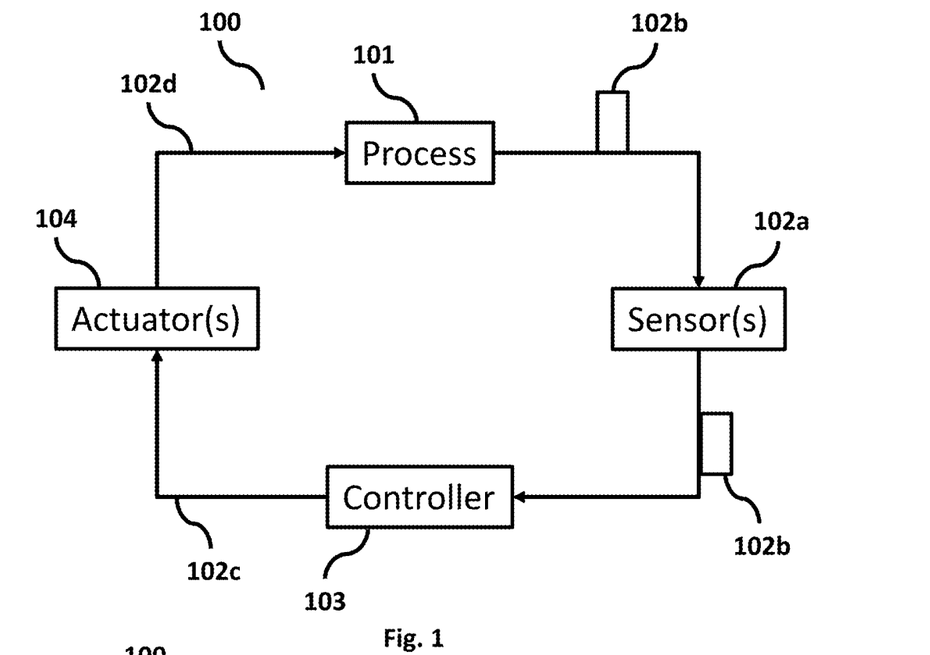
FIG. 1 illustrates a flow chart of one embodiment of a cyber-physical system.

FIG. 1 illustrates a flow chart of one embodiment of a cyber-physical system 100 comprising one or more physical sensors 102*a*, a physical sensor means 102*b*, and a virtual sensor means 102*c*, 102*d*. The cyber-physical system 100 further comprises a one or more actuators and at least one process 101, which for example could be a power plant or a water treatment plant, being part of the cyber-physical system 100.

Figure 2:
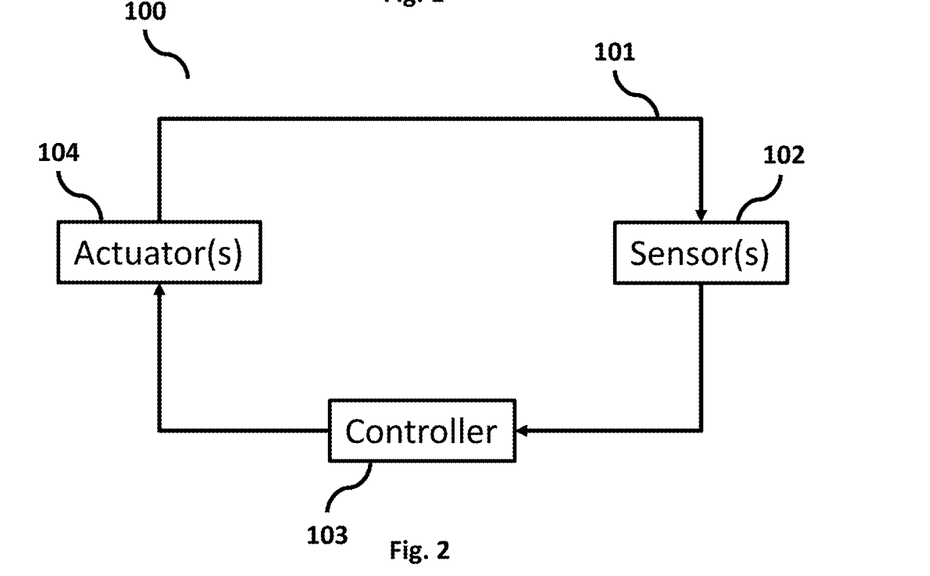
FIG. 2 illustrates a flow chart of another embodiment of a cyber-physical system.

FIG. 2 illustrates a flow chart of another embodiment of a cyber-physical system 100 comprising one or more physical sensors 102*a*, a physical sensor means 102*b*, and a virtual sensor means 102*c*. The cyber-physical system 100 further comprises a one or more actuators 104.

Figure 3:
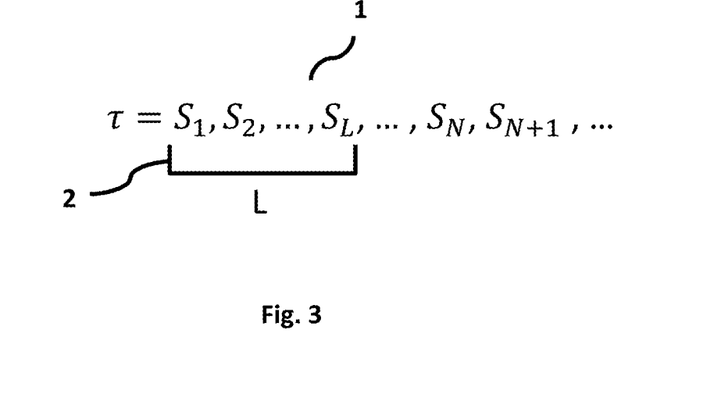
FIG. 3 illustrates one embodiment of a representation of a time series.

FIG. 3 illustrates one embodiment of a representation of a time series 1 with the lag window 2 and the lag parameter L indicated.

Figure 4:
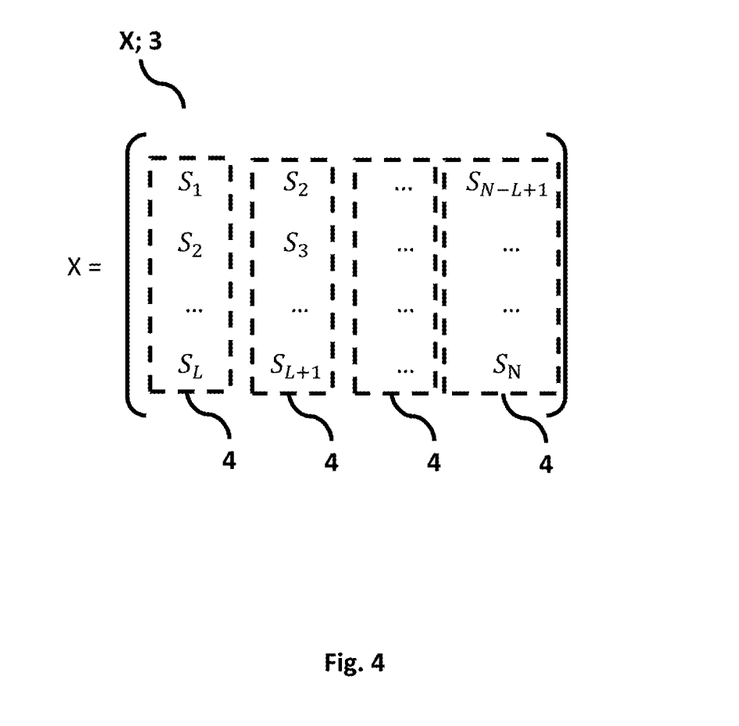
FIG. 4 illustrates one embodiment of a trajectory first matrix.

FIG. 4 illustrates one embodiment of a trajectory first matrix X comprising a number of lagged vectors 4.

Figure 5:
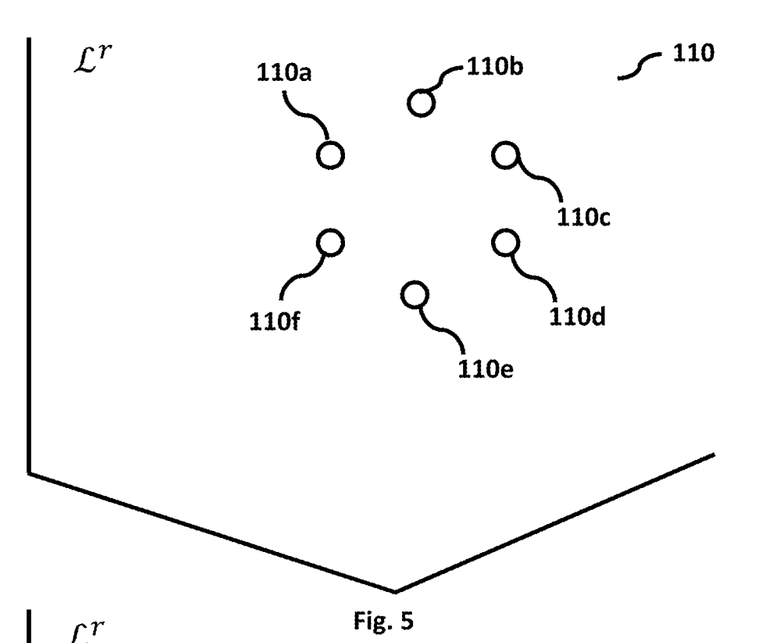
FIG. 5 illustrates a cluster of projected vectors in a subspace.

FIG. 5 illustrates a cluster 110 of projected vectors 110*a*-110*f* in a subspace $\mathcal{L}^r$. It shall be noted that FIG. 5 only illustrates one embodiment of projected vectors 110*a*-110*f*, in most real time applications the number of projected vectors would be significantly larger than in the illustrations of the appended figures.

Figure 6:
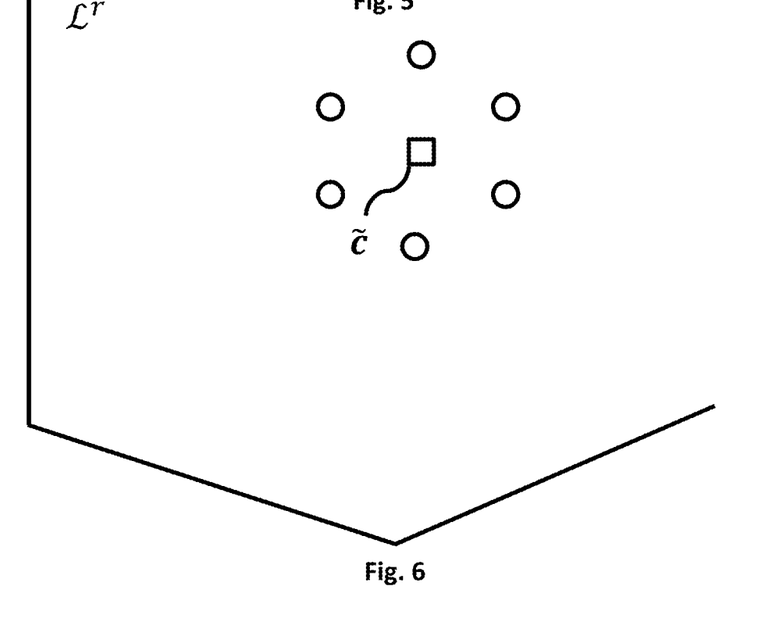
FIG. 6 illustrates a cluster of projected vectors and a centroid in a subspace.

FIG. 6 illustrates a cluster 110 of projected vectors 110*a*-110*f* and a centroid $\tilde{c}$ in a subspace $\mathcal{L}^r$. In the embodiment as illustrated in FIG. 6 the centroid $\tilde{c}$ has been computed based on the projected vectors/projected lagged vectors 110*a*-110*f*.

Figure 7:
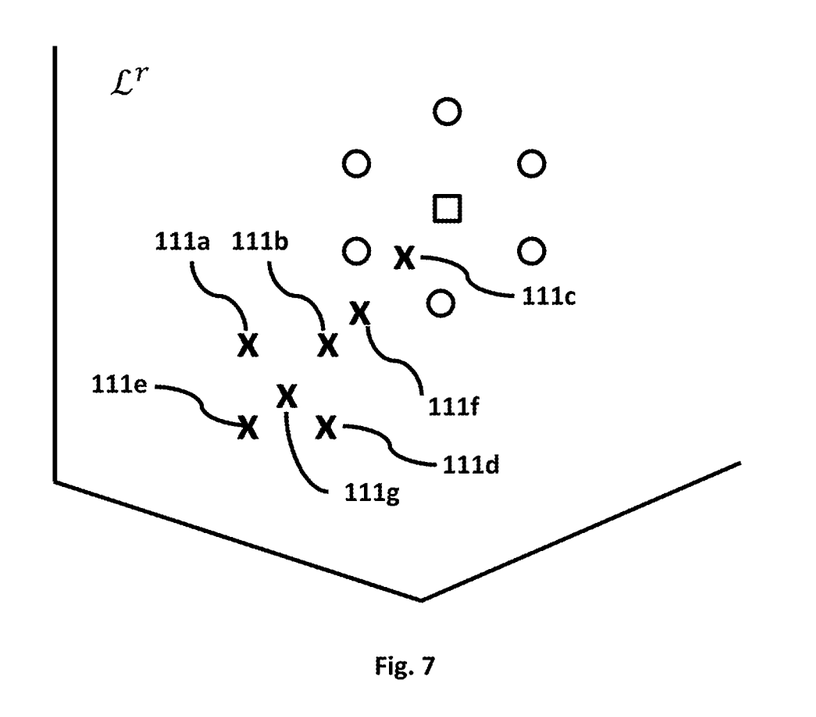
FIG. 7 illustrates a cluster of projected vectors in, a centroid, and projected vectors of an attack in a subspace.

FIG. 7 illustrates a cluster 110 of projected vectors 110*a*-110*f* in a centroid $\tilde{c}$, and projected vectors of an attack 111*a*-111*g* in a subspace $\mathcal{L}^r$. The illustration in FIG. 7 shows one embodiment of an attack, or anomaly, wherein the projected vectors of an attack 111*a*-111*g* clearly depart from the cluster 110 and the centroid $\tilde{c}$ indicating an attack or anomaly. It shall be noted that the solution as described herein can be used both for detecting attacks and detecting other forms of anomalies, such as problems with sensors, wear and tear to the cyber-physical system 100 and more.

Figure 8:
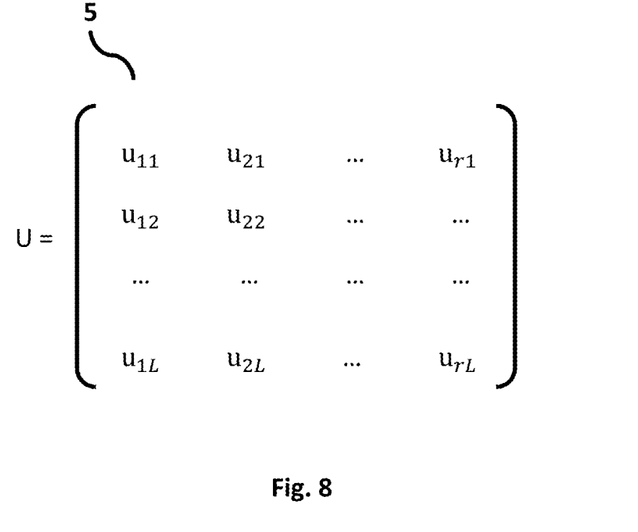
FIG. 8 illustrates a second matrix.

FIG. 8 illustrates a second matrix U; 5 with a number of rows corresponding to the lag parameter L and a number of columns corresponding to the statistical dimension r, i.e. an L-by-r matrix. In one embodiment the columns represent the noise-reduced information from the first set of eigenvectors.

Figure 9:
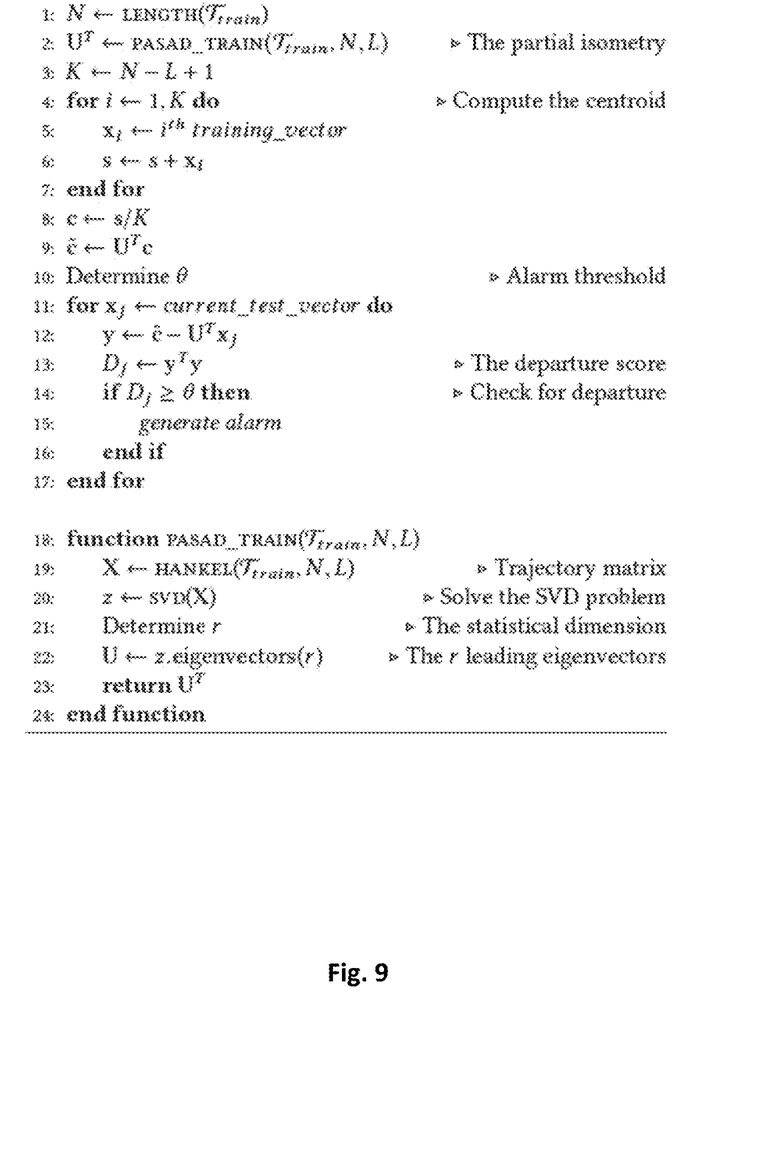
FIG. 9 illustrates a pseudo code of one embodiment of the solution as described herein.

FIG. 9 illustrates a pseudo code of one embodiment of the solution as described herein, wherein PASAD is a departure-based process-level detection of attacks on a cyber-physical system for Process-Aware Stealthy-Anomaly/Attack Detection as described herein.

In one embodiment a univariate real-valued time series of sensor measurements is collected from the cyber physical system of any of the embodiments in FIG. 1 or FIG. 2. It shall be noted that the time series 1 can be extracted at any position in the cyber-physical system 100. For example, in one embodiment the time series 1 is extracted from the sensor(s) 102*a*, in another embodiment the time series 1 is extracted from a physical sensor means 102*b*, in yet another embodiment the time series 1 is extracted from a cyber sensor means 102*c*, such as a software loop extracting information or any other form of software sensor means.

To exemplify, one embodiment will be described in relation to the drawings, wherein the training stage is divided into three steps and the normal operation stage is the fourth step. In Step 1 a time series 1 is collected:

$$\tau = S_1, S_2, \ldots, S_L, \ldots, S_N, S_{N+1}, \ldots$$

The time series 1 comprise raw process data from one or more sensor means 102*a*; 102*b*; 102*c*. It shall be noted that in some embodiments the raw sensor data might be from a single source, in some it might be compiled raw sensor data from multiple sensor means 102*a*; 102*b*; 102*c*. However, for the reason of clarity, raw sensor data is different from for example machine learning, wherein the data is used to create models and understanding the data.

In the training stage a lag parameter L is defined. The lag parameter L is the same lag parameter L both during the training stage and during the normal operation stage.

Let the lag parameter L be an integer, a training subseries t of a training subseries length N is embedded in the lag parameter-dimensional (L-dimensional) vector space by forming K, for all $1 \leq i \leq K$, where $K=N-L+1$, L-lagged vectors:

$$S_i = (S_i, S_{i+1}, \ldots, S_{i+L-1})^T$$

For all $1 \leq i \leq K$, where $K=N-L+1$, and constructing the trajectory matrix:

$$x = \begin{pmatrix} S_1 & S_2 & \cdots & S_{N-L+1} \\ S_2 & S_3 & \cdots & \cdots \\ \cdots & \cdots & \cdots & \cdots \\ S_L & S_{L+1} & \cdots & S_N \end{pmatrix}$$

whose columns are the lagged vectors.

The L-dimensional vector space can in different embodiments be different sorts of vector space, such as a linear vector space or a Euclidean space.

In Step 2 to extract noise-reduced information describing the deterministic behavior of the control system, the Singular Value Decomposition (SVD) of the trajectory matrix X is performed to obtain the L eigenvectors $u_1, u_2, \ldots, u_L$ of the so-called lag-covariance matrix $XX^T$. Then, the statistical dimension r of the time series—the number of degrees of freedom that account for the deterministic variability—is determined.

In Step 3 after the noise-reduced information has been obtained a mathematical representation of the normal process behavior is identified. Let U be an L-by-r matrix whose columns are the r eigenvectors $u_1, u_2, \ldots, u_r$ corresponding to the r leading eigenvalues, and let $\mathcal{L}^r$ be the subspace spanned by the column vectors of U. Compute the sample mean of the lagged vectors $x_i$, $1 \leq i \leq K$, as $$c = \frac{1}{K}\sum_{i=1}^{K} x_i$$

And the centroid of the cluster they from in $\mathcal{L}^r$ as:

$$\tilde{c} = Pc$$

wherein $P = U(U^T U)^{-1} U^T = UU^T$.

$UU^T$ is a projection matrix. In the process of obtaining a mathematical representation of the normal process behavior, the lagged vectors 4 during training are projected onto the signal subspace $\mathcal{L}^r$ as described above as part of step 3. As a mathematical interpretation, this projection is in fact implicit as a result of the isometry trick, as described hereinafter.

The r eigenvectors obtained from the SVD of the trajectory matrix X form an orthonormal basis for the subspace $\mathcal{L}^r$ which is presumed to contain most of the signal information recorded in the time series 1 of sensor means measurements. The central idea is then to check whether or not current sensor observations, in the form of lagged vectors 4 in the trajectory space, conform with the information obtained about the signal during normal process operation, in the form of a subspace $\mathcal{L}^r$ of the trajectory space. Naturally, since $\mathcal{L}^r$ is a subspace of $\mathbb{R}^L$ and every lagged vector resides in $\mathbb{R}^L$, we opt to find the best representation of x in $\mathcal{L}^r$. By best representation we mean the vector p in $\mathcal{L}^r$ that is the closest possible to x in the sense that $\|p-x\|$ is minimal.

By construction, the subspace is the same as the range of the matrix U, the projection matrix that maps vectors in $\mathbb{R}^L$ to $\mathcal{L}^r$ is given by $P = U(U^T U)^{-1} U^T$. For the projection matrix P to be defined, the columns of U must be linearly independent so that $U^T U$ is invertible. The column vectors $u_i$ from U, resulting from the SVD of the trajectory matrix X in step 2 are not only linearly independent but also orthonormal. That means that $U^T U = I$, where I is the identity matrix and the projection matrix is thus reduced to $P = UU^T$. By means of the isometry trick, as described herein and hereinafter, this leads to a simplified computing based on a simplified version of P, from $P = UU^T$, in the form of $U^T$.

As the best representation of the lagged vectors in the subspace can be obtained by an orthogonal projection, we first project the lagged vectors during training onto $\mathcal{L}^r$ and compute the centroid $\tilde{c}$ of the resulting cluster. Then, to detect malicious changes in the process behavior, the method and device check, in real time, if the most recent sensor observations are persistently departing from the cluster of projected lagged vectors during training in the signal subspace, see the description of step 4 below. In one embodiment, this is done by keeping track of the distance between the most recent test vector and the centroid of the cluster.

In step 4, which is during the normal operation stage, the distance from the centroid $\tilde{c}$ is tracked to detect attack-indicating changes or other structural changes in the system. The distance is tracked for every lagged vector for incoming sensor observations, i.e for every lagged vector j>K. This can for example be done through computing the squared Euclidian distance from the centroid $\tilde{c}$ in $\mathcal{L}^r$.

$$D_j = \|\tilde{c} - Px_j\|^2$$

Finally, generating an alarm whenever $D_j$ is greater, alternatively greater or equal, than a threshold.

To summarize, in the training phase (steps 1-3 as described above), the time series is embedded in the L-dimensional vector space, and a subspace is identified by determining the statistical dimension r of the series and the set of r eigenvectors of the lag-covariance matrix. The lagged vectors 4 used for training are then (implicitly) projected onto the subspace, and the centroid $\tilde{c}$ of the cluster they form is computed. Then, in the detection phase (step 4 as described above), the method and device actively check if lagged vectors (j>K) are departing from the cluster by tracking the distance $D_j$ from the centroid $\tilde{c}$.

The parameters N, r, L might be selected differently in different embodiments, however, some examples are provided herein to understand the different parameters as used in the method and devices.

There are mainly three parameters involved, the length N of the initial subseries of the time series 1, wherein the initial subseries is used for training. The lag parameter L and the statistical dimension r. For the length of the training subseries, one practice is to have it sufficiently large so that it incorporates an essential part of the signal in the noisy time series 1. To determine the lag parameter L and the statistical dimension r, there are standard SSA (Singular spectrum analysis) recommendations and guidelines. Other alternatives comprise that the statistical dimension corresponds to leading eigenvectors providing a good description of the signal, the lag parameter minus the statistical dimension eigenvector corresponds to noise, and assisted by a scree plot.

For the lag parameter L, in one embodiment $L \leq N/2$, which in practice often proves adequate. As for the statistical dimension, one option is to choose r such that the r leading eigenvectors provide a good description of the signal and the lower L-r eigenvectors correspond to noise. The choice of r can be assisted by a scree plot.

To determine the threshold for an alarm, the method or device is used to create a validation series. In another embodiment, the threshold is defined as the maximum departure score corresponding to observations in the specified range plus a relatively small constant.

The invention claimed is:

1. A computer-implemented method in a cyber-physical system for determining normal process behavior of the system, wherein the cyber-physical system comprises at least one sensor means, and the computer-implemented method comprises the steps:
   collecting a time series of raw process data from the at least one sensor means,
   defining a lag parameter,
   defining a training subseries of length being a portion of the time series representing a normal process behavior, thus selecting a portion of the time series, applying a sliding window mechanism with a length of the lag parameter to the time series, forming a defined quantity of lagged vectors from the training subseries of length lagged with the lag parameter, wherein the defined quantity is a number of lagged vectors equal to the training subseries length minus the lag parameter plus one, embedding the lagged vectors in a vector space ($\mathbb{R}^L$) with a number of dimensions equal to the lag parameter, constructing a trajectory matrix wherein the columns are the embedded lagged vectors, performing Singular Value Decomposition of the trajectory matrix obtaining a first set of eigenvectors, wherein the number of eigenvectors in the first set is equal to the lag parameter, selecting a statistical dimension of the time series, applying the statistical dimension selecting the first eigenvectors from the first set of eigenvectors to extract noise-reduced information describing the deterministic behavior of the process, using the noise-reduced information to create a mathematical representation of the normal process behavior by: creating a second matrix (U) with a number of rows corresponding to the lag parameter (L) and a number of columns corresponding to the statistical dimension (r), wherein the columns are the noise-reduced information from the first set of eigenvectors, computing the sample mean (c) of the lagged vectors, defining a subspace ($\mathcal{L}^r$) spanned by the column vectors of the second matrix, projecting the lagged vectors onto the defined subspace ($\mathcal{L}^r$), calculating a centroid ($\tilde{c}$) of the cluster formed in the subspace ($\mathcal{L}^r$), calculating a departure score as the distance between a most recent lagged vector of the lagged vectors and the centroid of the cluster, and applying the mathematical representation of the normal process behavior to the system to detect one or more anomalies.

2. The method according to claim 1, wherein the sample mean is computed as:

$$c = \frac{1}{K}\sum_{i=1}^{K} x_i$$

wherein, $x_i$ is the $i^{th}$ lagged vector and K is a number of lagged vectors.

3. The method according to claim 1, wherein the projected vectors of the lagged vectors form a cluster.

4. The method according to claim 1, wherein the centroid ($\tilde{c}$) of a cluster c is calculated as:

$$\tilde{c} = Pc$$

wherein $P = U(U^TU)^{-1}U^T = UU^T$, wherein P is a projection matrix, U is a matrix, and $U^T$ is the transpose of matrix U.

5. The method according to claim 1, wherein selecting a statistical dimension of the time series is conducted according to at least one of standard singular spectrum analysis recommendations, the statistical dimension corresponding to leading eigenvectors provide a good description of the signal, the lower lag parameter minus the statistical dimension eigenvectors correspond to noise, and assisted by a scree plot.

6. A method in a cyber-physical system, trained according to claim 1, for determining anomalies from the normal process behavior of the system, wherein the cyber-physical system comprises at least one sensor means and the method comprises the steps:

collecting a time series of raw process data from the at least one sensor means, applying a sliding window mechanism with a length of a lag parameter to the time series, forming a lagged vector from the time series lagged with the lag parameter, thus selecting a portion of the time series, and calculating for the lagged vector any one of a distance from a centroid ($\tilde{c}$).

7. The method according to claim 6, wherein the distance from the centroid ($\tilde{c}$) is a squared Euclidean distance from the centroid ($\tilde{c}$) in ($\mathcal{L}^r$) calculated as:

$$D_j = \|\tilde{c} - Px_j\|^2$$

wherein, $x_i$ is the lagged vector for j greater than a number of lagged vectors K, and P is a projection matrix.

8. The method according to claim 7, wherein the distance from the centroid ($\tilde{c}$) is a squared Euclidean distance from the centroid ($\tilde{c}$) in ($\mathcal{L}^r$) calculated as:

$$D_j = \|\tilde{c} - U^Tx_j\|^2,$$

wherein, $x_i$ is the lagged vector for j greater than the number of lagged vectors K.

9. The method according to claim 7, wherein the method further comprises the step:

determining a threshold for said distance based on at least one of observations from the lagged vectors forming a cluster and lagged vectors from normal process operation after a training stage.

10. The method according to claim 9, wherein the method further comprises generating an alarm if the distance from the centroid ($\tilde{c}$) exceeds the determined threshold.

11. The method according to claim 6, wherein the time series is a continuous time series.

12. A device adapted to be arranged in a cyber-physical system for determining any one of a normal process behavior of the system and anomalies from the normal process behavior of the system, wherein the device is adapted to perform the method of claim 1.

13. A non-transitory computer-readable medium comprising instructions which, when executed by a computer, cause the computer to carry out steps of claim 1.

* * * * *